United States Patent Office 3,606,286
Patented Sept. 20, 1971

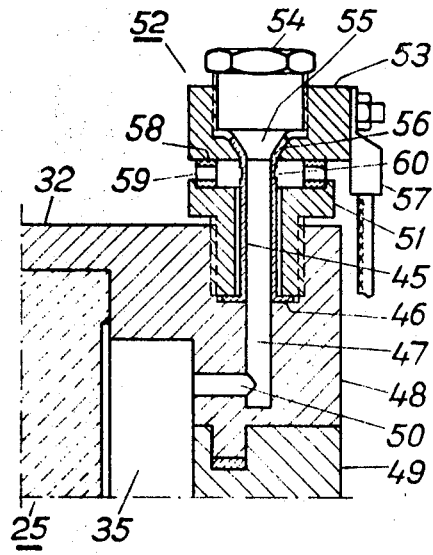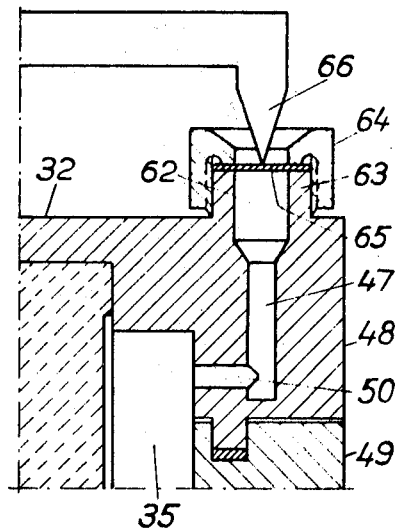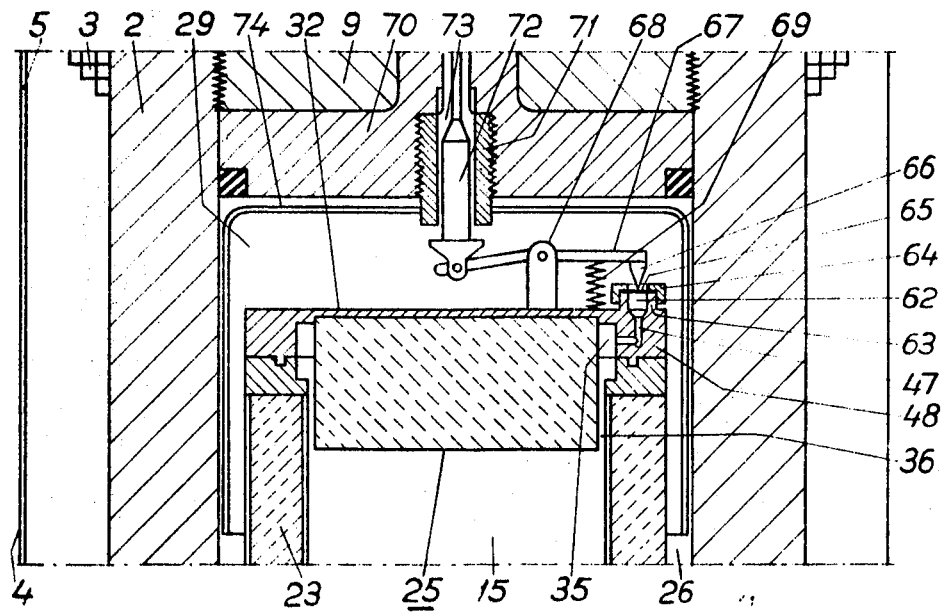

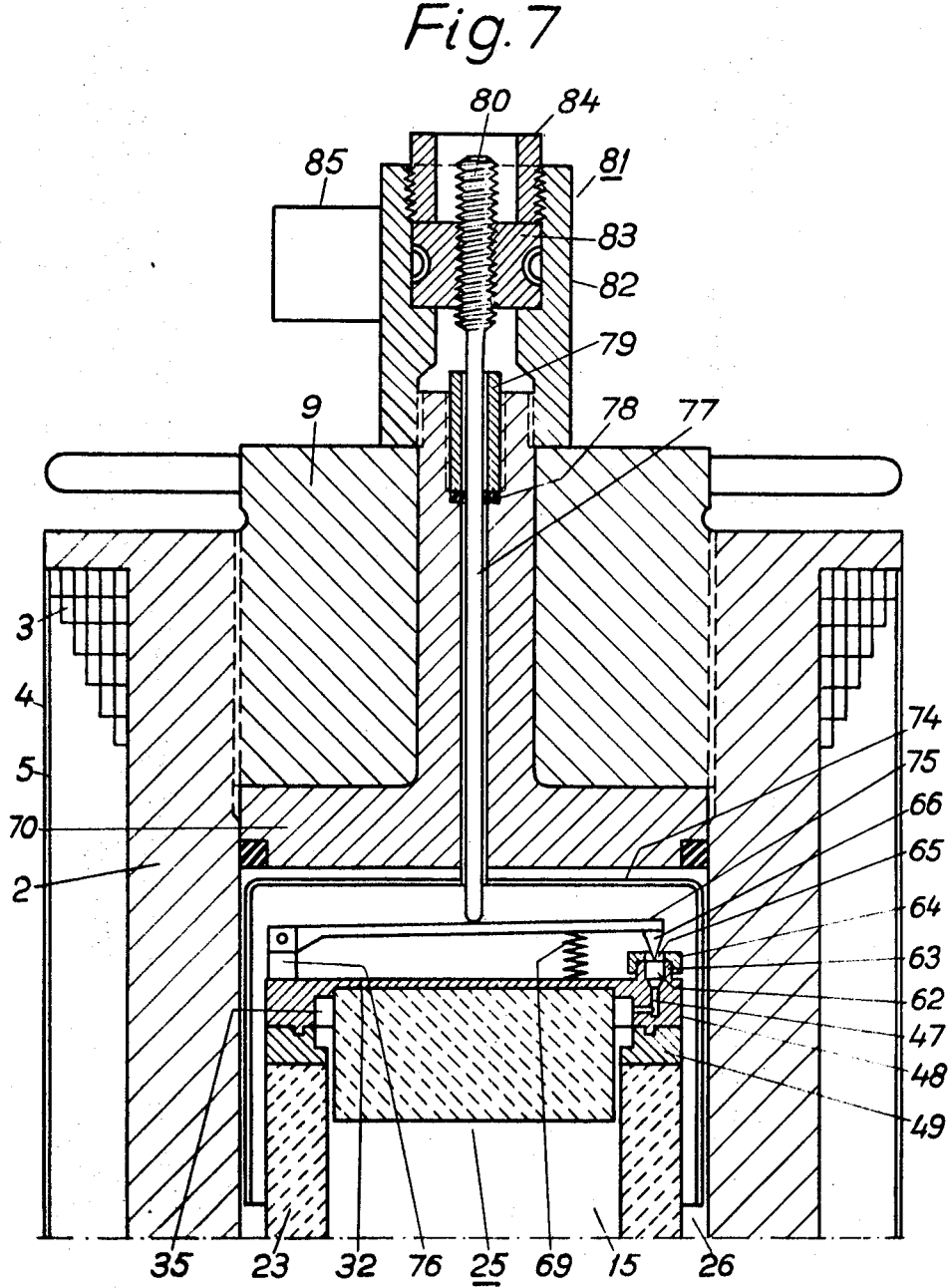

3,606,286
FURNACE FOR HEAT TREATING OBJECTS UNDER HIGH PRESSURE
Hans Lundstrom, Robertsfors, Sweden, assignor to Allmanna Svenska Electriska Aktiebolaget, Vasteras, Sweden
Filed Sept. 15, 1969, Ser. No. 857,752
Claims priority, application Sweden, Sept. 18, 1968, 12,545/68
Int. Cl. F27b 5/00
U.S. Cl. 263—40
15 Claims

ABSTRACT OF THE DISCLOSURE

A cylindrical furnace for treating material at high temperature in a gaseous atmosphere under high pressure includes a pressure chamber and an insulating hollow body arranged inside the pressure chamber with a space therebetween. The insulating body includes a cylindrical sheath having an insulating lid and bottom sealing its ends. A furnace chamber is arranged within the insulating hollow body. Connections are provided near the top and bottom of the furnace chamber between the furnace chamber and the space. An arrangement is also provided for normally obstructing through-flow through at least one of these connections. This member can be opened, for example by melting a part of it, by a flow of electrical current or destroying such a part by an explosion, so as to permit gas influenced by pressure differences due to the temperature difference to flow out of the furnace chamber and down between the hollow body and the wall of the pressure chamber so as to be cooled by the wall of the pressure chamber.

BACKGROUND OF THE INVENTION

(1) Field of the invention

The present invention relates to cylindrical furnaces, preferably vertical, for simultaneous treatment of a material at high temperatures, up to 1500° C. and high pressures, preferably 500 bars and above.

(2) The prior art

A furnace of this type is disclosed in the U.S. patent applications Ser. No. 676,623, filed on Oct. 9, 1967 and entitled "Vertical Tube Furnace for Isostatic Compression" and Ser. No. 855,911 filed on Sept. 8, 1969 and entitled "Furnace for Heat-Treating Objects Under High Pressure," both asigned to the assignee of the present application.

Furnaces of this type make it possible to pressure sinter powder bodies, for instance. Sintering under high pressure produces greater density than sintering at atmospheric pressure, and thus better properties in the finished products in many respects. It seems to enable large scale production of alloys which, with conventional casting of molten metal to billets, acquire an unfavourable structure with strong segregation. By manufacturing these alloys of fine-grained powder and then sintering bodies formed of the powder by means of hot isostatic compression, a product can be obtained having an extremely fine-grained structure.

The furnace consists essentially of a pressure chamber with a furnace chamber which is enclosed in a hollow insulating body arranged in the pressure chamber, the hollow body consisting of an insulating sheath closed by an insulating lid and an insulating bottom. The gas normally used, argon, which at the high operating pressure being used has very great density but at the same time low viscosity, only 4–5 times that of air at atmospheric pressure, is thus very mobile. Since, in view of the density, it also has very great heat capacity, it is important that the heat-insulating hollow body is designed so that the least possible convection occurs between the actual furnace chamber and the inner walls of the pressure chamber so that the heat losses can be kept low. However, the good heat insulation also means that the furnace cools slowly. Slower cooling than is necessitated by the heat-treatment of material inserted in the furnace is thus unnecessarily time-consuming and makes poor use of an expensive production means and unnecessary costs.

SUMMARY OF THE INVENTION

The invention is substantially characterised in that near the upper and lower part of the furnace chamber inside the insulating hollow body are connections between the furnace chamber and the space outside the insulating hollow body and that in the connection at the upper part of the furnace chamber a member is arranged to obstruct through-flow said member being opened by means of an electric or mechanical impulse so that gas flows out from the furnace chamber and down between the hollow body and the wall of the pressure chamber, being thus cooled by this wall. Because of the higher temperature in the furnace chamber, the pressure medium flows out into the cooler surrounding chamber and down along the walls of the pressure chamber so that it is cooled and flows back into the furnace chamber at the bottom of the furnace. In a furnace of about 1.5 m. in height the pressure difference between the inside and outside of the hollow insulating body at its upper part 0.1 bar or more at normal sintering temperatures and the convection is therefore lively. The cooling speed can be regulated, for example by a suitable choice of the area of the connection. The member obstructing through-flow may consist of a tube closed at the outer end. The tube is arranged in or on the lid of the insulating body and may be connected to an electric current source in such a way that the tube or its closure is electrically heated to melting point so that a connection is opened between the furnace chamber and the space nearest the inner wall of the pressure chamber. In one embodiment the melting part of the tube is located completely outside the lid so that it can easily be replaced and connected to electric conductors. The connection then suitably has a first part of the tube permanently connected to the lid and a replaceable melting part which can easily be connected to this first part. The melting part may consist of a piece of tube closed at one end and having terminals for connection to electric conductors. In order to facilitate the melting, the melting part may have a part which is thinner than the rest of the tube so that rapid heating and melting is obtained at the desired point. The melting part may also consist of a membrane sealing a tube. One current conductor may be connected to the membrane at its centre and the other conductor to the tube. The replaceable melting part may also consist of a tube connected directly to a channel in the lid by a clamping means arranged at the mouth of the channel and another clamping means electrically insulated from the lid. The current is then supplied through the lid and a conductor connected to the latter clamping means. It is not necessary for the melting part to be resistance-heated. It is also feasible to burn a hole in the tube or membrane by means of an arc between an electrode and the tube or membrane. Yet another possible way of opening the connection between the furnace chamber and the space nearest the wall of the pressure chamber is to apply an electrically triggered explosive cartridge arranged in or near the connection member and open the connection by exploding the seal or the tube.

The connection may also be opened purely mechanically. The member obstructing through-flow may consist of a membrane arranged in a container at the mouth of a channel arranged in the lid of the insulating hollow body. The connection is opened by a mechanical opening device on the lid which is arranged to puncture the membrane when the opening device is released. The opening device may consist of a point arranged on a lever which is pressed against the membrane and punctures it. In one embodiment the lever is operated by a piston which runs in a cylinder in the lid of the pressure chamber. The lever can then be operated by allowing gas on one side of the piston to pass through a valve in the lid of the pressure chamber so that the piston is displaced into the cylinder under the influence of the pressure in the pressure chamber. Another possibility is to operate the lever by means of a pressure rod in the lid of the pressure chamber, which is operated with the help of a motor-driven operating device.

BRIEF DESCRIPTION OF THE DRAWING

The invention will be further described with reference to the accompanying drawings in which some embodiments are shown by way of example.

DESCRIPTION OF THE PREFERRED EMBODIMENTS

Figure 1:
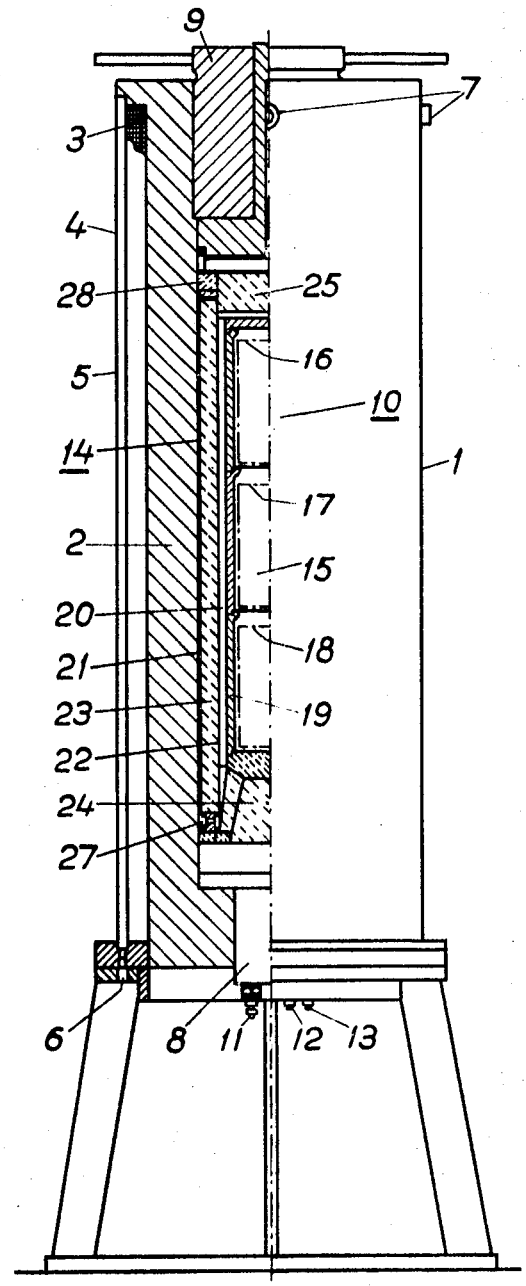
FIG. 1 shows in half section a furnace according to the invention.

The pressure chamber consists of a thick-walled cylindrical steel tube 2 around which a wire sheath 3 of high-strength, cold-rolled steel has been wound under prestressing. Because the winding has such great compressive stress, the cylinder can withstand an inner over-pressure of over 3000 bar and can also take up the axial forces operating on the lid and bottom due to the pressure medium. Argon gas is used as pressure medium. Between the wire sheath 3 and an outer sheet metal casing 4 is an annular gap 5 for coolant which is led in through the inlet 6 at the bottom of the pressure chamber and out through the outlets 7 at the upper part of the chamber. The ends of the cylinder are closed, at the bottom by a plug 8 and at the top by a threaded lid 9. The bottom plug 8 supports the furnace unit 10 enclosed in the pressure chamber and has electric through-bushings 11 to feed heating elements to heat the furnace, through-bushings 12 for thermoelement conductors, through-bushings 13 for the supply of current to the melting unit of the connection member and a tubular bushing, not shown, for compressed gas. The furnace unit 10 comprises a heat-insulating sheath 14 which surrounds the furnace chamber 15. In the furnace chamber electric heating elements in the form of three loops 16, 17 and 18 are suspended on the inside of a number of refractory earthenware pipes 19. Between the sheath 14 and the earthenware pipes 19 is an annular gap 20 for the lead-in. The loops are connected through the bushings 11 to a current source, not shown. The heat-insulating sheath 14 consists of two concentrical tubes 21 and 22 and an insulating material 23 in the cell between them. The sheath 14 is provided with an insulating bottom 24 and an insulating lid 25. The furnace chamber 15 communicates through the opening 27 in the lower part of the furnace with the space or gap 26 outside the insulating body formed by the sheath 14, bottom 24 and lid 25. Between the lid 25 and the sheath 14 is a guide ring 28. In the space 29 is a connection 30 consisting of a tube 31 permanently fixed to the upper plate 32 of the lid 25 and an exchangeable part 33 resting on the support 34. The tube 31 opens over the gap 35 between the control ring 28 and the lid 25. The gap 35 communicates with the furnace chamber 15 through the narrow gap 36.

Figure 2:
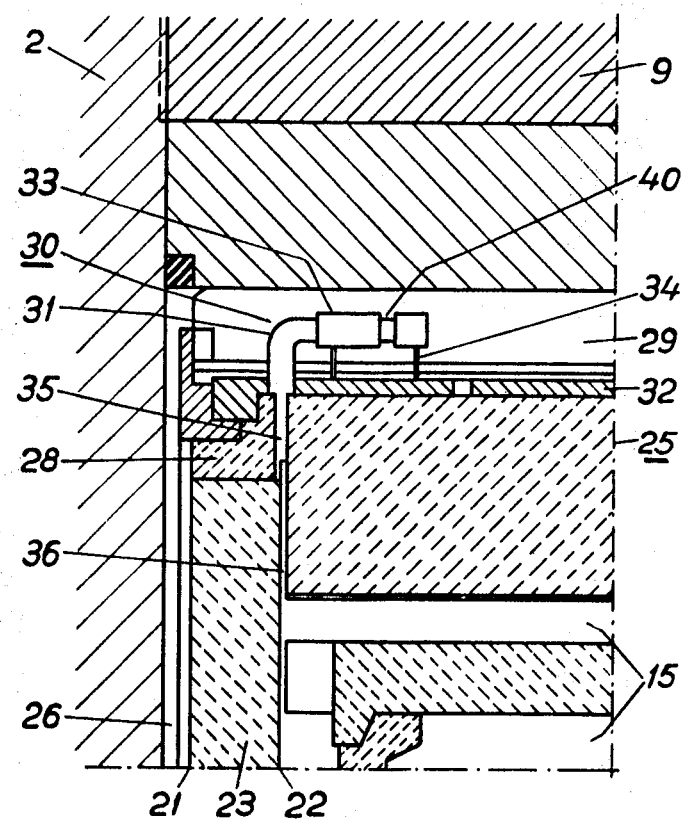
FIG. 2 shows on a larger scale a detail of the upper part of such a furnace.
Figure 3:
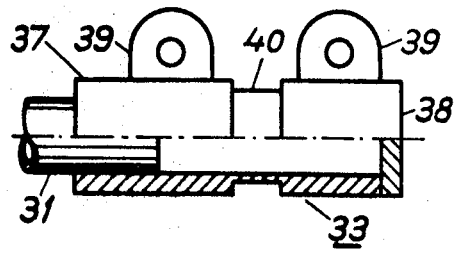
FIGS. 3 and 4 show different embodiments of replaceable, openable members for obstructing through-flow, FIG. 5 another upper part of a furnace with a member of different design, FIGS. 6 and 7 furnaces with mechanical members to open the connection and FIG. 8 on a larger scale a detail of the lid of a furnace chamber having a channel and a membrane arranged at the mouth of the channel to be mechnically punctured by a conical point.
Figure 4:
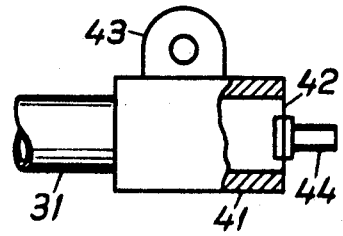

In the embodiment according to FIGS. 2 and 3, the part 33 consists of a metal tube 37 provided with a lid 38 and two ears 39 for attachment to electric conductors. Between the electric terminals is a groove 40 to form a weak point which facilitates melting of the tube. In FIG. 4 is seen an example of an exchangeable part which is sealed by a membrane. This consists of a tube 41 which is closed at one end by the membrane 42. The tube 41 is provided with an ear 43 and the membrane 42 with a bolt 44 for connection to electric conductors. FIG. 5 shows an embodiment in which the exchangeable meltable unit consists of a tube 45 with a flange 46. This tube is connected to the channel 47 in the guide ring 48 of the lid 25, the ring cooperating with the guide ring 49 of the sheath 14. The channel 47 communicates with the space 35 through the channel 50. The tube 46 is clamped in the ring 48 by a threaded socket 51 and a clamping device 52 consisting of a socket 53 and a screw 54 with a conical point 55 which expands the tube 46 when screwed into the socket 53 so that a conical flange 56 is formed which is clamped between the point 55 and a conical seat. A cable 57 is connected to the socket 53. The tube 46 is connected through the flange 48 to another cable, not shown. Between the clamping device 52 and the socket 51 is an electrically insulating ring 58 of ceramic material with radial openings 59. In order to ensure that the tube 46 melts opposite the gap between the terminal device 52 and the socket 51, the tube is provided opposite this gap with a weak point in the form of a groove 60 of the type shown clearly in FIG. 3 and designated there as 40.

The material in the tubes 33 and 46 may be an aluminium alloy with high strength, for example duralumin, but other materials may also be used. A tube having an inner diameter of 5 mm. and an area of the material at the melting section of 5 mm.$^2$, that is a material thickness of 0.3 mm., can be melted in 5 seconds by a current of about 200 ampere. When the tube has been melted or the membrane punctured, the gas flows from the furnace chamber 15 through the gaps 36 and 37, the tube 31 or channels 50 and 57, out into the space 29 and from there down along the wall of the pressure chamber in the gap 26, where it is cooled. The cooling speed can be selected by a suitable dimensioning of the channels and tubes or by using throttling plates.

FIGS. 6–8 show a furnace where the connection between the furnace chamber 15 and the space between the insulating hollow body and the pressure chamber is opened mechanically. The outer enlarged part 62 of the channel 47 opens into an externally threaded socket 63 which is welded to the guide ring 48 and, together with the nut 64, forms the holder for a membrane 65. When the point 66 punctures the membrane 65 the connection is opened between the furnace chamber and the surrounding space. In the embodiment according to FIG. 6 the point is carried by a lever 67 which is pivotably journalled in ears 68 on the upper plate 32 of the lid 25. The return spring 69 keeps the point lifted from the membrane 65. In the sealing part 70 of the pressure chamber lid 9 is a cylinder 71 with a piston 72 flexibly connected to the lever 67. The space 73 in the cylinder 71 over the piston 72 is in communication with a valve, not shown, above the container lid 9. By opening this a pressure difference is obtained between the two sides of the piston so that this moves into the cylinder and the point 66 punctures the membrane 65. When the valve is closed and gas has flowed through a restricted channel or through suitably controlled leakage from the space 29 to the space 73 so that pressure equalisation has been obtained, the return spring returns the point and the piston to their initial positions so that gas can flow freely through the hole formed in the membrane 65. In the shown embodiment there is a cap 74 in the upper part of the pressure chamber, which prevents the gas from coming in direct contact with the wall of the upper part of the pressure chamber. In the embodiment according to FIG. 7 the lever 75 is journalled in ears 76 and activated by a return spring 69. The lever is actuated by a rod 77 passing through the sealing part 70 of the lid where there is a high pressure seal 78 which is kept in place by a socket 79 screwed into the neck of the sealing part. The upper part 80 of the rod is shaped as a screw. To the neck of the sealing part is also connected an operating unit 81 which consists of a socket 82 and a nut 83 shaped as a worm wheel and held in position by a socket 84 and operated by a screw worm driven by a motor unit 85. This embodiment also enables remote operation which is desirable from the safety point of view. Ball nuts are suitable for this equipment. The connection between the furnace chamber 15 and the space 29 and gap 26 is opened by turning the nut 83 so that the rod 77 presses down the lever 75 so that the point 66 makes a hole in the membrane 65. The size of the through-flow opening can be regulated by returning the point 66 a suitable distance. The gas flow can also be regulated depending on the gas temperature in the gap 26 with the help of thermo elements which form indicators in a control equipment. This control possibility enables a temperature to be maintained in the gap 26 during the greater part of the cooling process, which is nearer to the maximum permitted temperature than would otherwise be possible. A shorter cooling time can thus be achieved.

The invention is naturally not limited to the embodiment shown in the drawings. Many variations are feasible within the scope of the following claims. At high operating pressures it is suitable from the safety point of view to use a pressure chamber with a high pressure cylinder having a completely smooth interior and inwardly projecting, piston-shaped end closures. The pressure chamber is then inserted in a press stand which takes up the axial forces operating on the end closures.

What is claimed is:

1. Cylindrical furnace for treating material at high temperature in a gaseous atmosphere under high pressure, comprising a pressure chamber, an insulating hollow body arranged inside the pressure chamber with a space therebetween, and comprising a cylindrical sheath, said sheath having an insulating lid and an insulating bottom sealing its ends, a furnace chamber within the insulating hollow body, connections near the upper and lower part of the furnace chamber across the insulating hollow body between the furnace chamber and the said space, a member in the connection at the upper part of the furnace chamber for obstructing through-flow, said member being openable so that, influenced by the pressure difference due to the temperature difference, gas flows out from the furnace chamber and down between the hollow body and the wall of the pressure chamber, being thus cooled by the wall of the pressure chamber.

2. Furnace according to claim 1, in which the member obstructing the through-flow comprises tube means arranged on the insulating lid and sealed at its outer end including at least one part which is meltable by the flow of electric current therethrough, and means for connecting said tube means part to a current source whereby said part can be electrically heated to melting point in order to open said connection.

3. Furnace according to claim 2, in which the meltable part of the tube means is arranged outside the insulating lid.

4. Furnace according to claim 2, in which the wall of the tube constitutes the meltable part.

5. Furnace according to claim 2, in which the meltable part comprises a membrane which covers the mouth of the tube means.

6. Furnace according to claim 4, in which the meltable part is included in a replaceable unit which is connected to a member arranged in the lid.

7. Furnace according to claim 6, in which the replaceable unit comprises a tube, and a clamping means arranged at the mouth of the channel and another clamping means electrically insulated from the lid for connecting said tube to said lid.

8. Furnace according to claim 4, in which the wall of the tube means has a smaller cross-sectional area at the desired melting point than elsewhere.

9. Furnace according to claim 4, in which the meltable part is heated by an electric arc.

10. Furnace according to claim 1, in which the connecting member comprises a tube arranged in the insulating hollow body, projecting from this and sealed at its outer part and an electrically triggered explosive cartridge arranged in or near the tube opens the connection by exploding the seal or the tube.

11. Furnace according to claim 1, in which the lid has a channel therein and the member to obstruct through-flow comprises a container at the mouth of said channel, and a mechanically operated opening device for puncturing the membrane.

12. Furnace according to claim 11, in which the opening device comprises a lever and a point arranged on the lever to puncture the membrane.

13. Furnace according to claim 12, in which there is a cylinder arranged in the lid of the pressure chamber and a piston in said cylinder connected to said lever, the lever being operated by lowering the pressure in the cylinder so that the piston is pushed into the cylinder by the pressure in the pressure chamber.

14. Furnace according to claim 12, in which a pressure rod which is displaceable through the lid of the pressure chamber is connected to the lever.

15. Furnace according to claim 14, in which a motor-driven operating device is connected to the pressure rod.

References Cited
UNITED STATES PATENTS

| | | | |
|---|---|---|---|
| 3,100,108 | 8/1963 | Selikson | 263—40 |
| 3,427,011 | 2/1969 | Boyer et al. | 263—40 |

JOHN J. CAMBY, Primary Examiner